Patented Feb. 10, 1925.

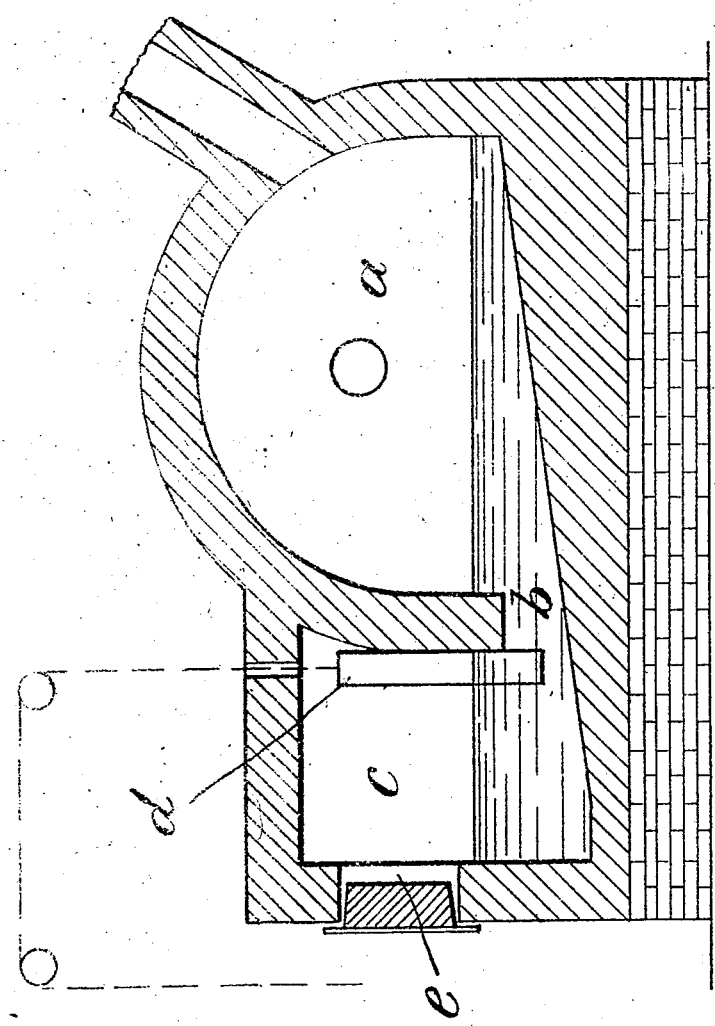

1,525,703

UNITED STATES PATENT OFFICE.

FILIP THARALDSEN, OF CHRISTIANIA, NORWAY.

ELECTRIC FURNACE FOR THE REFINING OF ZINC OR OTHER VOLATILE METALS.

Application filed September 25, 1922. Serial No. 590,43.

*To all whom it may concern:*

Be it known that I, FILIP THARALDSEN, a citizen of Norway, residing at Christiania, Norway, have invented certain new and useful Improvements in Electric Furnaces for the Refining of Zinc or Other Volatile Metals, of which the following is a specification.

In the refining of volatile metals, more especially zinc, by distillation by means of electric heating, the distillation chamber, where electric energy is supplied, generally communicates through an opening or channel with a special reservoir where the materials to be refined are melted. During the operation the channel or opening is filled with the bath of molten metal staying at the same level in the distillation chamber and the melting chamber and forming a liquid seal between the two. The heat necessary for the melting is transmitted to the melting chamber by conduction in the metal bath which is heated in the distillation room by the source of heat of this. Generally the melting reservoir is left open in order to facilitate the introduction of fresh materials for refining successively as the operation is going on.

This arrangement involves certain inconveniences if it is used in the refining of materials with varying contents of extraneous metals, for instance as well ordinary spelter as zinc alloys.

Generally the temperature required to distil the volatile metal, for instance, zinc, will increase with increasing quantities of extraneous metals present. The heat from the distillation chamber will be transmitted to the melting chamber and the temperature in the latter will rise to the temperature prevailing in the distillation chamber. As the temperature in the latter must be kept very high so much heat is transmitted to the melting chamber that the metal here will also begin to vaporize, which is very undesirable for the attendance of the furnace, and at the same time may involve loss of metal.

This difficulty is obviated by the present invention which provides regulation of the transverse section of the channel or opening connecting the distillation chamber and the melting chamber while the operation is going on. If an alloy is treated which requires high temperature in the distillation chamber to drive off the zinc, the transmission of heat to the melting chamber can be regulated by a suitable regulation of the size of the connecting opening so that the transmission of heat is maintained so low that no vaporization of metal takes place in the melting chamber, and on the other hand the heat is sufficient to secure an easy melting of the material to the fluid state.

It is easily understood that by such regulation it is possible to refine the most different materials in the same furnace simply by regulating the transmission of heat to the melting chamber according to the composition and nature of the material.

The regulation can be effected in different ways. The device indicated on the annexed drawing may for instance be used. The drawing shows a vertical longitudinal section through a refining furnace. —*a*— designates the distillation chamber, which through the opening or channel —*b*— communicates with the melting chamber —*c*—. In the melting chamber before the opening —*b*— is suspended the plate or register —*d*— which by suitable arrangements can be raised or lowered, thereby covering the opening more or less.

In the open melting chambers hitherto used for the refining operations in question, an oxidation of metal takes place on the surface in the melting chamber causing a formation of greater or smaller quantities of zinc ashes as a by-product.

To avoid this the melting chamber is— according to the invention—covered or arched, and the opening through which the materials are introduced, is provided with a door or some other closing device preferably with a packing to make it as airtight as possible. In this way the access of air to the metal surface in the melting chamber is limited to the short moments when the chamber is opened just for the introduction of fresh materials, and the time necessary herefor can by suitable arrangements be reduced to a minimum. In the drawing the melting chamber —*c*— is covered, and the charge opening —*e*— is provided with a tight-fitting door. The slot in the roof of the melting chamber through which the regulation chain for the register —*d*— is passing, can also, if desired, be made tight by suitable packing.

Having now described my invention I declare that what I claim is:

1. An electric furnace for refining zinc or other volatile metals comprising a melting chamber, a distillation chamber communicating therewith through an opening, and means for regulating the transverse section of said opening during the refining operation for controlling the temperature in the melting chamber.

2. An electric furnace for refining zinc comprising a melting chamber, a distillation chamber communicating therewith through an opening, and an adjustable register at said opening adapted to be displaced to regulate the transverse section of the opening during the refining operation.

3. An electric furnace for refining zinc comprising a melting chamber, a distillation chamber communicating therewith through an opening, a register at said opening, and means to raise and lower the register to regulate the transverse section of the opening during the refining operation.

4. An electric furnace for refining zinc comprising a covered melting chamber, a distillation chamber communicating therewith through an opening and means for regulating the transverse section of said opening during the refining operation to control the temperatures of the chambers.

5. An electric furnace for refining zinc, comprising a melting chamber, a distillation chamber, a passage connecting the chambers below the surface of the metal, and means for varying the cross sectional area of said passage, whereby the temperature in the melting chamber is regulated.

In witness whereof I affix my signature.

FILIP THARALDSEN.